Aug. 13, 1957 H. J. SEAMAN 2,802,408
ROTARY MATERIAL-WORKING IMPLEMENTS
Filed Oct. 5, 1951 3 Sheets-Sheet 2
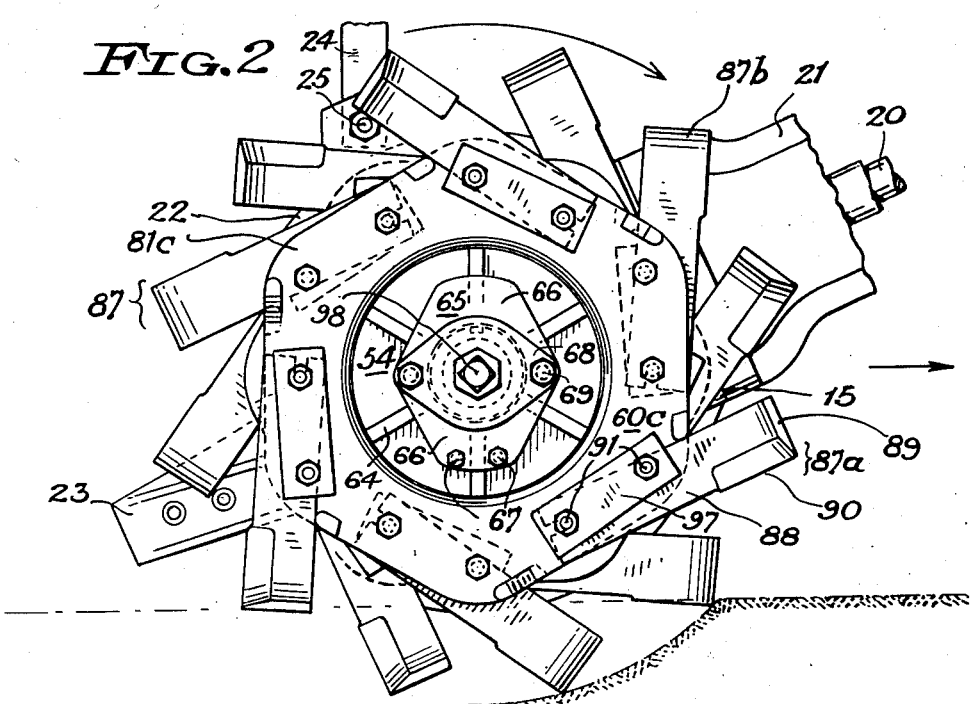
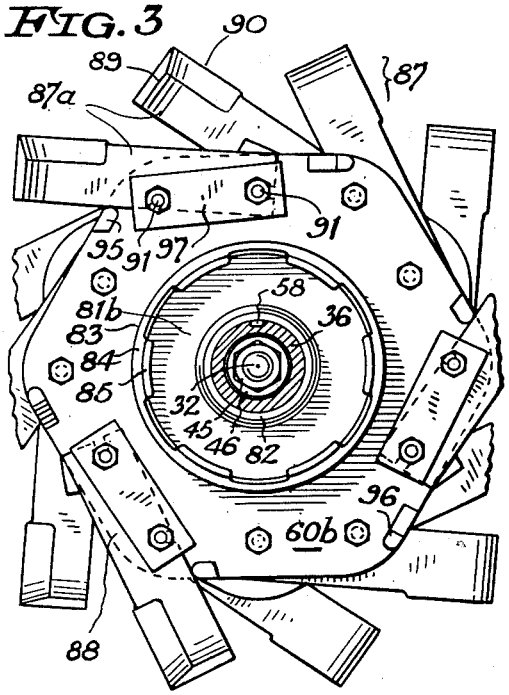
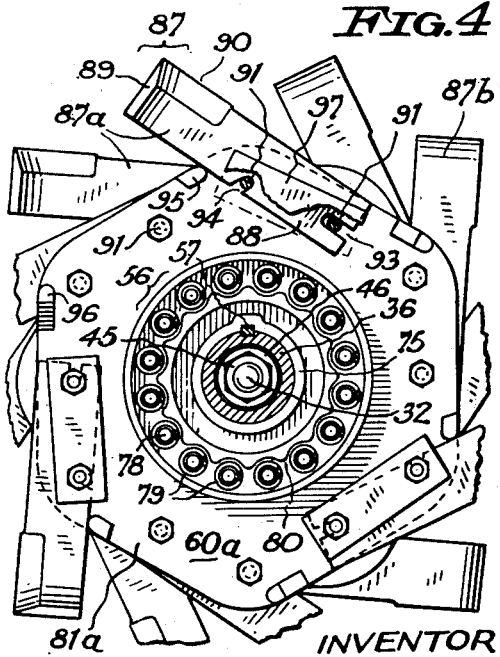
INVENTOR
HARRY J. SEAMAN
ATTORNEY

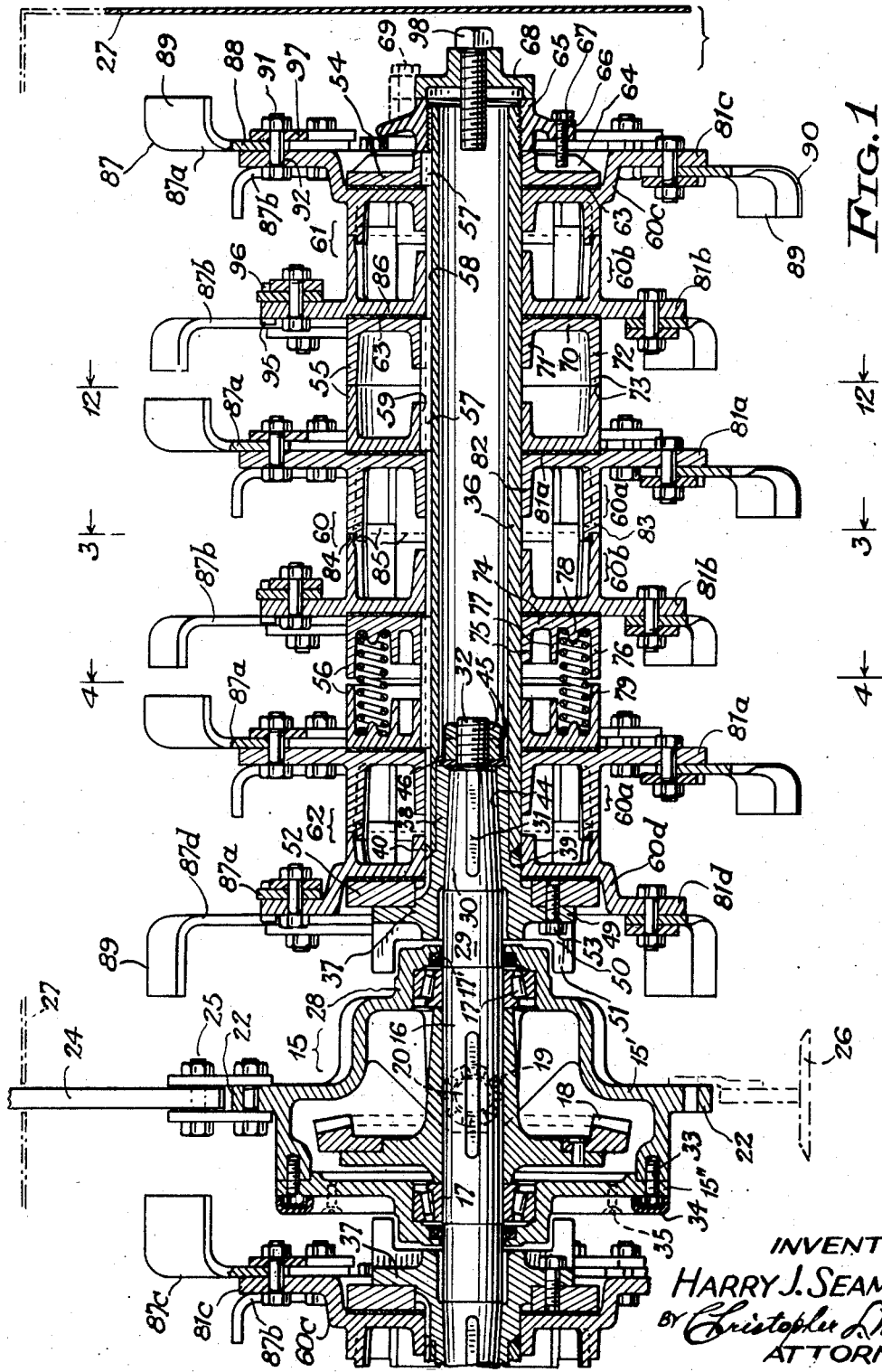

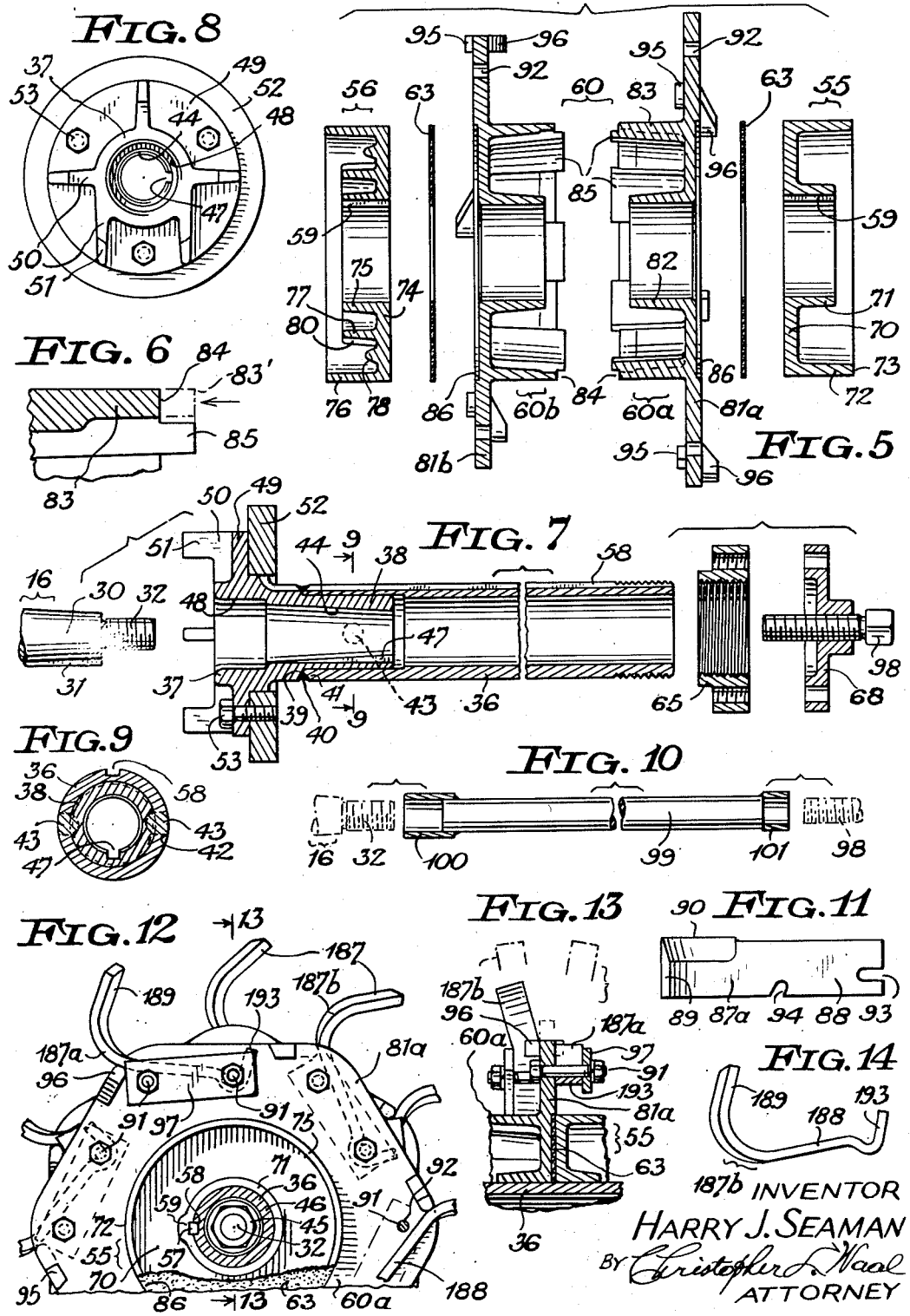

United States Patent Office
2,802,408
Patented Aug. 13, 1957

2,802,408

ROTARY MATERIAL-WORKING IMPLEMENTS

Harry J. Seaman, Milwaukee, Wis., assignor, by mesne assignments, to Seaman-Andwall Corporation, Milwaukee, Wis., a corporation of Wisconsin Application October 5, 1951, Serial No. 249,951

6 Claims. (Cl. 97—216)

The present invention relates to rotary implements adapted for digging, pulverizing, mixing, and otherwise working various materials, as in agriculture and in road building and road maintenance.

An object of the invention is to provide a rotary implement having a tool-carrying rotor which is so arranged as to minimize accumulation of soil, grass and other material thereon and to facilitate cleaning.

Another object is to provide a rotary implement having improved tool-mounting members which are of simple, durable, and inexpensive construction, and which will permit various arrangements of material-working tools.

A further object is to provide a rotary implement which is so constructed as to effect favorable distribution of heavy axial spring pressure on slipping friction clutch means for the tool mounting members.

A still further object is to effect improvements on the type of implement disclosed in my Patent 2,438,189 for Rotary Ground-Working Implement, issued March 23, 1948, and in my Patent 2,515,268 for Rotary Soil-Working Implement, issued July 18, 1950.

The invention further consists in the several features hereinafter described and claimed.

In the accompanying drawings,

Fig. 1 is a sectional rear elevational view of a rotary implement constructed in accordance with the invention, a portion of the implement rotor being omitted;

Fig. 2 is a right-hand end elevation of the implement;

Fig. 3 is a transverse sectional elevational view taken generally on the line 3—3 of Fig. 1;

Fig. 4 is a transverse sectional elevational view taken generally on the line 4—4 of Fig. 1;

Fig. 5 is a sectional elevational view of tool mounting members and associated parts;

Fig. 6 is a detail sectional view of a coupling portion of one of the tool mounting members;

Fig. 7 is a longitudinal sectional view of a tubular implement shaft and associated parts;

Fig. 8 is a detail end view of a hub member for the shaft;

Fig. 9 is a detail sectional view taken generally on the line 9—9 of Fig. 7;

Fig. 10 is a detail view of a puller rod for the implement rotor;

Fig. 11 is a detail view of one of the material-working tools or tines;

Fig. 12 is a transverse sectional view taken generally on the line 12—12 of Fig. 1 but showing the rotor equipped with tools of a different form;

Fig. 13 is a sectional view taken generally on the line 13—13 of Fig. 12, and

Fig. 14 is a detail view of a modified form of tool or tine.

In the drawings, the numeral 15 designates a drive housing which has journalled therein the middle portion of a transversely extending horizontal shaft member 16, as by roller bearings 17. The shaft member 16 has keyed thereto a bevel gear 18 which meshes with a bevel drive pinion 19 on a forwardly projecting drive shaft 20. The drive shaft is suitably journalled in the housing and extends in a forwardly projecting torque tube 21 the rear end of which is rigidly secured to the housing. The housing 15 is invertible to suit the direction of rotation of the drive shaft 20, and is provided with apertured upper and lower flanges 22 and a rear bracket 23, Fig. 2. The housing is suitably supported at an adjustable elevation, as by a suspension bar 24 which has a detachable pivotal connection 25 with the upper housing flange 22. In some instances, the housing carries therebelow an adjustably mounted depth shoe 26, Fig. 1. A suitably supported hood 27 extends over the drive housing and has opposite parallel side walls, one being shown.

The roller bearings 17 are disposed in laterally projecting cylindrical hubs or embossments 28 formed on opposite sides of the drive housing, each hub having a shaft seal 17'. The shaft member 16 projects coaxially through the hubs 28 and includes cylindrical portions 29 and terminal tapered portions 30. Each cylindrical shaft portion 29 is substantially the same diameter as the middle portion of the shaft within the housing and projects a substantial distance from the outer end face of the associated housing hub. Each tapered shaft portion 30 has a lateral key 31 and a reduced coaxial screw-threaded stem 32.

The hubbed drive housing is here shown to be formed by separable housing sections 15' and 15", the latter being a circular cover plate which is secured to the main housing section 15' by a circular series of screws 33. The screw heads are enclosed and protected by a channel ring 34 which is secured to the housing section 15", as by screws 35.

Tubular extension shaft members 36 are rigidly but detachably secured to the opposite ends of the intermediate shaft member 16 and each comprises a length of heavy metal pipe or tubing secured at its inner end to a bushing or hub member 37, such as of cast steel, the hub member having a sleeve portion 38 which is pressed into the end portion of the pipe. The pipe end abuts against an annular shoulder 39 on the hub member and is secured thereto by a weld 40, the abutting parts being formed with a V-shaped notch 41 to receive the weld. The opposite sides of the hub member have drilled openings 42 in which welds 43 are formed to join the pipe to the hub member. The hub member 37 has a tapered axial bore 44 in which the correspondingly tapered shaft end 30 is firmly seated and secured by a pair of nuts 45 threaded onto the shaft stem 32, the inner nut bearing against a washer 46 which is interposed between this nut and the adjacent end of the hub member sleeve 38, and the key 31 fitting in a keyway 47 formed in the hub member. The inner end portion of the rotary hub member 37 has a clearance bore 48 receiving the cylindrical portion 29 of the shaft member 16, and the inner face of the hub member lies adjacent to the end face of the housing hub 28. The rotary hub member further includes an annular disk-like flange 49 disposed near the housing hub and provided at its inner face with a plurality of radiating ribs or vanes 50 the edges of which are close to the end wall of the housing hub. The outer ends of these vanes have axially extending wings or extensions 51 which overlie the housing hub and have a circular path of travel close to the cylindrical periphery of the housing hub. The revoluble vanes and their extensions present forwardly facing or leading shoulders or edges and have a scraping and fanning action which prevents accumulation of soil and winding of trash around the housing hub 28 and around the shaft member 16.

The intermediate shaft member 16 is preferably formed of heat-treated alloy steel, while the detachable tubular extension shaft members, which are of different lengths for machines of different capacity, may be formed of less expensive steel. The three connected shaft members form a tool shaft, the opposite ends of which lie adjacent to the side walls of the hood 27.

The outer flat face of the flange 49 of the rotary hub member has secured thereto a friction clutch member 52 in the form of a flat annular plate or disk, such as of cast iron, this clutch member being attached to the flange 49 by screws 53. Each tubular shaft member 36 has mounted thereon a series of axially spaced friction clutch members 54, 55, and 56, hereinafter more fully described, which are slidable axially on the shaft member 36 but are held against relative rotation with respect to this shaft member, as by spline keys 57 fitting in a keyway 58 in the shaft member and in keyways 59 in the several clutch members.

Interposed between the several friction clutch members are spool-shaped tool carriers 60, 61 and 62, hereinafter more fully described, each tool carrier rotatably fitting on the shaft member 36. Friction disks 63 are placed between the friction clutch members and the tool carriers and are axially urged against these parts by spring pressure, as hereinafter described, to drive the tool carriers with the shaft member 36, while permitting slipping of these carriers when subjected to excessive loads.

The clutch member 54, which is splined or featherkeyed to the outer end portion of the tubular shaft member, is in the form of a hubbed annular plate with radial ribs 64 at its outer side and a smooth flat surface at its inner side engageable with the adjacent friction disk. This clutch member is confined by a retaining nut 65 which is threaded onto the outer end of the tubular shaft member 36. The nut has opposite wings 66 one of which carries a pair of peripherally spaced screws 67 extending parallel to the rotor axis, the inner ends of the screws straddling one of the clutch member ribs 64, so as to lock the nut in adjusted position. A cover 68 is detachably secured to the nut by screws 69, thus preventing entrance of soil into the tubular shaft member 36.

The clutch members 55 comprise a pair of opposed annular spacer elements of trough-like cross-section each having a flat disk portion 70, an annular hub-forming flange 71 and a peripheral flange 72 of generally cylindrical shape surrounding the hub flange, the axial dimension of the peripheral flange being greater than that of the hub flange. The flat edges 73 of the peripheral flanges of the two clutch members are machined and placed in axial abutment, as seen in Fig. 1, to transmit axial pressure between these members. Each disk portion 70 has a smooth, flat, machined surface to engage the adjacent friction disk 63, which is of the same diameter as the clutch member, and each hub flange 71 is splined or feather-keyed to the tubular shaft member 36.

The clutch members 56 are in the form of a pair of opposed annular spring casings or cages each having a flat disk portion 74, an annular hub-forming flange 75, a peripheral flange 76 of generally cylindrical shape surrounding the hub flange, and an intermediate concentric flange 77 of generally cylindrical shape between the hub flange and the peripheral flange. Between the flanges 76 and 77 the inner side of each disk portion 74 is provided with a circular series of projections or buttons 78 for positioning the ends of compressed coiled springs 79 which extend in parallel relation to the rotor axis and which urge the casings apart. The flange 77 has scallops 80 at its outer side to form pockets for the springs. The number of springs may be varied to obtain the desired spring pressure. Each disk portion 74 has a smooth, flat, machined surface to engage the adjacent friction disk, which is of the same diameter as the clutch member, and each hub flange is splined or feather-keyed to the tubular shaft member 36. It is usually desirable to place the spring casings at an intermediate point in the series of clutch members, so as to distribute accumulated wear and to equalize the spring pressure along the tubular shaft member irrespective of friction between the clutch member and the shaft member, and also to avoid excessive weight at the free end of the shaft.

Each of the tool carrier units 60, 61, and 62 of each rotor section comprises a pair of complementary body members or sections which cooperate to form a spool-shaped assembly. The unit 60 is formed of a pair of annular body members 60a and 60b with respective disk or plate portions 81a and 81b, the unit 61 has annular body members 60c and 60b with respective disk or plate portions 81c and 81b, and the unit 62 has annular body members 60a and 60d with respective disk or plate portions 81a and 81d. Each of the several body members forms a combined tool mounting plate and spacer, and the plate portion thereof has an annular hub-forming flange 82 and an outer flange 83 of generally cylindrical shape surrounding the hub flange. The outer flange 83 has an axial dimension greater than that of the hub flange 82 and has a diameter substantially the same as the diameter of the associated clutch member. The peripheral flanges 83 of each pair of complementary body members have flat, annular, machined edges 84, Figs. 5 and 6, which are disposed in axial abutment, as seen in Fig. 1, to transmit axial pressure between these body members. The flanges 83 are further provided at their adjacent edges with interengaging lugs or jaws 85 which prevent relative rotation between the two body members. These lugs are arranged in concealed position at the inner sides of the flanges 83, the outer sides of the flanges presenting smooth surfaces of generally cylindrical shape. Each tool carrier body member is preferably in the form of a casting, such as of malleable iron, and the edge of the cylindrical flange 83 of this casting originally includes portions 83', Fig. 6, which extend in unbroken alignment with the edges of the lugs or jaws 85. These casting portions 83' are removed by a simple lathe operation which forms the projecting lugs 85 and also forms the smooth, flat, machined edge 84 on the flange 83. The direction of the lathe cut is indicated by the arrow in Fig. 6. The disk or plate portion of each tool carrier body member projects outwardly beyond the cylindrical flange 83 and is preferably of generally polygonal shape, a hexagonal shape being shown. The face of the disk portion opposite the peripheral flange 83 is provided with a shallow coaxial counterbore 86 which receives and radially confines the associated friction disk 63, the diameter of the friction disk being approximately the same as the diameter of the peripheral flange 83 and the exterior diameter of the adjacent clutch member. The endmost tool carrier body members 60c and 60d of each rotor unit are similar to the other body members except that the disk or plate portions 81c and 81d thereof are centrally cupped to reduce the length of the rotor unit. These cupped disk portions receive the associated clutch members 54 and 52, respectively. The tool carrier assembly is duplicated at the left-hand rotor unit.

Each of the several tool carrier body members detachably carries thereon at opposite sides a number of angularly spaced material-working tools or tines designated generally by the numeral 87 and here shown to be of four types 87a, 87b, 87c, and 87d. Each tool is formed from a length of flat bar stock, preferably of resilient steel, and has an inner or shank portion 88 abutting flatwise against a face of the plate or disk portion of the associated carrier body member adjacent to an outer edge of the disk portion. The outer portion 89 of each tool is bent away from the plane of the disk portion and has a sharpened cutting edge 90. The tool is secured to the carrier body member by a pair of peripherally spaced bolts 91 which pass through openings 92 in the body member and extend in notches 93 and 94 in the tool shank. The bolt openings 92 are formed transversely through the plate or disk portion at the corner regions thereof and at intermediate points, as seen in Figs. 4 and 5. The notch 93 forms a fork at the inner end of the tool shank and extends substantially parallel to the length of the shank, and the notch 94 is formed in the trailing side edge of the tool shank and receives one of the corner bolts. The side or lateral notch 94 extends at an angle, and the associated bolt therein resists outward displacement of the tool. Beyond the corner bolt the trailing edge of the tool shank engages one of a series of equally spaced lugs 95 formed on the opposite side faces of the carrier member disk portion at the periphery of the disk portion. Also formed at the opposite sides of the disk portion are a series of equally spaced lugs 96 which form abutments for tools of a modified type hereinafter described. The lugs of each series are arranged alternately at opposite sides of the disk portion, one of the lugs 95 being directly opposite one of the lugs 96. In the present instance, each disk portion carries six equally spaced tools, the tools being arranged alternately on opposite sides of the disk portion. Each tool is clamped between the disk portion and a parallel, apertured clamping bar or plate 97 which is secured in place by a pair of the bolts 91. The tool is positioned by engagement of the bolts with the notches 93 and 94 in the tool shank, and the working pressure on the tool is resisted by these bolts and by the engagement of the edge of the tool shank with the associated abutment 95.

When it is desired to replace a tool, it is only necessary to loosen the nuts of the two clamping bolts without removing the nuts or the clamping plate, whereupon the tool can be detached by swinging it forwardly about its notched end which turns or pivots on the associated bolt, and then withdrawing the tool endwise. The installation of a new tool is equally simple, the tool being inserted endwise into the slot-forming space between the flat faces of the carrier disk portion and the clamping plate to engage the end notch 93 of the tool with the associated bolt, then swinging the tool rearwardly to engage the side notch 94 of the tool with the corner bolt and to abut the trailing side edge of the tool against the lug 95, and then tightening the nuts.

The two complementary body members or sections of each spool-shaped tool carrier unit are coupled in angularly offset relation so that the tools on one of these sectoins will be positioned about midway between the tools on the other section. This angular offset is maintained regardless of slipping of the tool carrier unit, so as to avoid excessive spacing of the tools, even though all of the slipping tool carrier units should become aligned. The load variations on the rotor are thus reduced, and the operation of the machine is improved, particularly when the machine is used for removing ice from roadways and other surfaces.

The construction of the tool carrier body castings is such that they can be inexpensively and expeditiously produced by green sand molding, while permitting convenient assembly to form the tool carrier units. The several clutch members can be similarly formed at relatively low cost. The heavy spring pressure for the slipping clutches is transmitted axially of the rotor unit at a substantial radius from the rotor axis approximately equal to the radius of the friction disks, so as to insure application of such pressure to the outer peripheral portions of the friction disks where it is most effective. By this arrangement the pressure distribution on the friction disks is improved and the inner portions of the disks are relieved of excessive concentrated pressure which would otherwise tend to overheat and break down the disk material.

The retaining nut 65 at the outer end of the tubular shaft member 36 serves to adjust the spring pressure for the slipping clutches to the desired value. Wear on the friction disks and other parts will reduce the spring pressure, but the spring pressure can be restored by turning the nut farther onto the shaft member.

The tools 87 are of a self-cleaning type suitable for general use in agriculture and for mixing materials. The laterally deflected tip portions 89 of the innermost tools 87c and 87d, Fig. 1, project toward the drive housing and are longer than those of the other tools, serving to break up and work the soil or other material under the housing.

A jack screw or puller screw 98 is axially threaded through the cover 68 for the tubular shaft member 36 and is adapted to cooperate with a strut bar or puller bar 99, Fig. 10, which may be temporarily inserted into the tubular shaft member after the cover 68 is detached. The strut bar has sockets 100 and 101 at opposite ends, the socket 100 being adapted to fit over the end of the shaft stem 32 after the nuts 45 and washer 46 are removed, and the socket 101 being adapted to receive the inner end of the jack screw 98 after the cover 68 is replaced. By then screwing the jack screw 98 inwardly, the tubular shaft member 36 with its hub member 37 and tool carrier means may be removed as a unit from the intermediate shaft member 16 without removing or disturbing the tool assembly.

In Figs. 12 and 13, the implement is provided with tools 187 of a modified form, and here shown to be of right-hand and left-hand types 187a and 187b, one of the latter being shown in Fig. 14. Each of the tools 187 is formed of flat bar stock, and each has a shank portion 188 and a laterally deflected, forwardly hooked soil-working portion 189. The front end portion of each tool shank is reversely bent to form a terminal hook or loop 193 which defines a notch opening outwardly approximately at right angles to the shank portion. The tool is detachably clamped to a side face of the tool carrier body member by a clamping plate 97 and the associated bolts 91, and is positioned by the notch-forming hook 193 engaging the intermediate bolt and by the tool shank bearing against the lug or abutment 96 of the tool carrier body member. The tools 187 are arranged alternately on opposite sides of the carrier disk portion, as seen in Figs. 12 and 13, and the paths of the tool tips are shown by broken lines in Fig. 13. These tools are of a high-penetration type suitable for use in breaking up hard materials.

In the operation of the implement, the tool shaft is driven from a convenient source of power, such as an internal combustion engine, not shown, to provide a suitable tool tip speed, usually several hundred feet per minute. The entire implement is moved slowly over the ground to be worked, in the direction indicated by the straight horizontal arrow of Fig. 2, the direction of rotation of the tool shaft being such as to assist the forward movement of the implement. During their rotation the tools 87 (or 187) dig into the ground or other material being worked and have a cutting, pulverizing, and mixing action on the material. If any of the tools strike stones, roots, or other obstructions in the soil, the associated tool carrier unit will slip momentarily with respect to the flanking clutch members and thus avoid damage to the mechanism. However, the other tool carrier units will continue to turn. The resilient tools are capable of yielding sideways when striking obstructions, thus minimizing damage to the tools. The tool-carrying rotor and its drive housing may sink into the material to a considerable depth much greater than that indicated in Fig. 2, particularly in the case of soft soil or other soft material.

The outer cylindrical flanges of the tool carrier units and clutching members not only transmit the axial clutching pressure but also by reason of their relatively large radius and smooth drum-like surface serve to minimize accumulation of dirt and trash on these parts and to facilitate cleaning. The disk portions of each spool-shaped tool carrier unit form tool-mounting heads which are axially spaced by the outer cylindrical flanges of the complementary body members of the unit.

The tubular extension shaft members 36 are firmly carried on the shaft member 16, but are readily detachable therefrom so as to permit the substitution of other extension shaft members of different lengths or of different construction for other material-working tools. Several sets of different tools may be provided to meet different working conditions. These tools may be carried on different sets of tool carriers, or they may be separate from the tool carriers. The tools and tool carriers can be quickly changed in the field.

What I claim as new and desire to secure by Letters Patent is:

1. In a rotary implement, a rotatable tool shaft, a tool carrier rotatably mounted on said shaft and having axially spaced tool-mounting portions, said carrier comprising a pair of opposed body members with hub portions rotatable on said shaft and with annular flanges surrounding said hub portions in outwardly spaced relation to said hub portions, each body member having one of said tool-mounting portions thereon projecting outwardly from the annular flange of said member, and friction clutch means on said shaft for driving said tool carrier, the edges of said annular flanges being in axial abutment to transmit axial clutching pressure between said body members.

2. In a rotary implement, a rotatable tool shaft, a tool carrier rotatably mounted on said shaft and having axially spaced tool-mounting portions, said carrier comprising a pair of opposed body members with hub portions rotatable on said shaft and with annular flanges surrounding said hub portions in outwardly spaced relation to said hub portions, each body member having one of said tool-mounting portions thereon projecting outwardly from the annular flange of said member, and friction clutch means on said shaft for driving said tool carrier, the edges of said annular flanges being in axial abutment to transmit axial clutching pressure between said body members, and said annular flanges having interengaging lugs for preventing relative rotation of said body members.

3. In a rotary implement, a rotatable tool shaft, a tool carrier rotatably mounted on said shaft and having axially spaced tool-mounting portions, said carrier comprising a pair of opposed body members with hub portions rotatable on said shaft and with annular flanges concentrically surrounding said hub portions in outwardly spaced relation to said hub portions, each body member having one of said tool-mounting portions thereon projecting outwardly from the annular flange of said member, and friction clutch means on said shaft for driving said tool carrier, the edges of said annular flanges being in axial abutment to transmit axial clutching pressure between said body members, and said annular flanges having interengaging lugs for preventing relative rotation of said body members, said endwise abutting annular flanges presenting a relatively smooth exterior drum-like surface, and said lugs being concealed by overlying portions of said flanges.

4. In a rotary implement, a rotatable tool shaft, a plurality of tool carriers rotatably mounted on said shaft and each comprising a pair of opposed spacer-forming body members with respective tool-mounting portions, and spring-pressed clutch means on said shaft for driving said tool carriers and including a pair of opposed clutch body members interposed between said tool carriers and slidably but non-rotatably mounted on said shaft, each clutch body member having an end wall and a hub portion and a tubular spacer portion surrounding said hub portion in outwardly spaced relation to said hub portion, the tubular spacer portions of said clutch body members being in edgewise axial abutment for transmitting axial clutching pressure.

5. In a rotary implement, a rotatable tool shaft, a tool carrier rotatably mounted on said shaft and having axially spaced tool-mounting plate portions, said carrier comprising a pair of opposed body members, and spring-pressed friction clutch means on said shaft for driving said tool carrier and including friction disks at opposite ends of said carrier, said body members having tubular spacer portions in edgewise abutment and of the same order of diameter as the outer diameter of the friction disks.

6. In a rotary implement, a rotatable tool shaft, a tool carrier rotatably mounted on said shaft and having axially spaced tool mounting portions, said tool carrier further having hub portions and a tubular portion surrounding said hub portions and extending between said tool mounting portions, said tubular portions being spaced outwardly from said hub portions, and spring-pressed friction clutch means on said shaft for driving said tool carrier and including friction disks the outer diameter of which is of the same order of size as the diameter of said tubular portion.

References Cited in the file of this patent

UNITED STATES PATENTS

| | | |
|---|---|---|
| 655,896 | Davis | Aug. 14, 1900 |
| 1,815,497 | Colson | July 21, 1931 |
| 1,907,567 | Paris | May 9, 1933 |
| 1,917,674 | Weaver | July 11, 1933 |
| 2,083,662 | Paris | June 15, 1937 |
| 2,324,065 | Coffing | July 13, 1943 |
| 2,438,189 | Seaman | Mar. 23, 1948 |
| 2,501,364 | Traver | Mar. 21, 1950 |
| 2,515,268 | Seaman | July 18, 1950 |
| 2,572,298 | Alvarez | Oct. 23, 1951 |
| 2,574,772 | Zorn | Nov. 13, 1951 |
| 2,582,482 | Edwards | Jan. 15, 1952 |
| 2,586,490 | Thompson | Feb. 19, 1952 |
| 2,651,159 | Roundtree | Sept. 8, 1953 |
| 2,666,570 | Howard | Jan. 19, 1954 |
| 2,683,406 | Kelsey | July 13, 1954 |
| 2,737,871 | Rogers | Mar. 13, 1956 |

FOREIGN PATENTS

| | | |
|---|---|---|
| 354,567 | Great Britain | Aug. 13, 1931 |
| 310,294 | Italy | Aug. 8, 1933 |
| 860,198 | France | Sept. 24, 1940 |